April 7, 1970 R. L. JAMES 3,505,673

DIGITAL INTEGRATOR-SYNCHRONIZER

Filed June 17, 1966 7 Sheets-Sheet 1

INVENTOR.
Robert L. James
BY Herbert L. Davis
ATTORNEY

INVENTOR.
Robert L. James
BY Herbert L. Davis
ATTORNEY

April 7, 1970 R. L. JAMES 3,505,673

DIGITAL INTEGRATOR-SYNCHRONIZER

Filed June 17, 1966 7 Sheets-Sheet 3

INVENTOR.
Robert L. James
BY Herbert L. Davis
ATTORNEY

DIGITAL INTEGRATOR-SYNCHRONIZER

INVENTOR.
Robert L. James
BY
[signature]
ATTORNEY

DIGITAL INTEGRATOR-SYNCHRONIZER

Filed June 17, 1966 7 Sheets-Sheet 5

INVENTOR.
Robert L. James
BY [signature]
ATTORNEY

DIGITAL INTEGRATOR-SYNCHRONIZER

Filed June 17, 1966 7 Sheets-Sheet 6

INVENTOR.
Robert L. James
BY Herbert L. Davis
ATTORNEY

INVENTOR.
Robert L. James
BY Herbert L. Davis
ATTORNEY

United States Patent Office 3,505,673
Patented Apr. 7, 1970

3,505,673

DIGITAL INTEGRATOR-SYNCHRONIZER

Robert L. James, Bloomfield, N.J., assignor to The Bendix Corporation, a corporation of Delaware Filed June 17, 1966, Ser. No. 558,327
Int. Cl. G08c 1/00
U.S. Cl. 340—347 4 Claims

ABSTRACT OF THE DISCLOSURE

A digital integrator-synchronizer wherein pulses are provided at a frequency corresponding to an input signal amplitude. A counter counts the total number of pulses for providing a corresponding digital output and a converter converts the digital output into an analog output having an amplitude corresponding to the integral of the input signal amplitude. The output of the converter is combined with the input signal to provide a synchronizing signal, and means are provided for controlling the counting direction of the counter, for inhibiting the counter from operating when erroneous commands are provided and for resetting the counter.

This invention relates to apparatus for providing integrated or synchronized signals and, more particularly, to digital means for integrating or synchronizing electrical input signals.

Electrical systems, including flight control systems or other servo systems, require integrated or synchronized input signals for proper operation. Heretofore, this has been accomplished by electromechanical apparatus having the disadvantages of moving parts and considerable weight, or by conventional electrical apparatus having slow response.

One object of this invention is to provide apparatus light in weight and having relatively fast response and no moving parts for integrating or synchronizing input signals.

Another object of this invention is to provide means adapted to receive an alternating current input signal and for providing an alternating current output signal as an integral function of the input signal.

Another object of this invention is to provide a closed loop system wherein the output signal is combined with the input signal so as to provide a synchronizing signal.

Another object of this invention is to provide means whereby pulses are provided at a frequency corresponding to the input signal amplitude. A counter provides digital outputs corresponding to the total number of pulses provided and a digital to analog converter converts the digital outputs into an analog output having an amplitude which is the integral of the input signal amplitude.

Another object of this invention is to provide novel means for demodulating the alternating current input signal.

Another object of this invention is to provide novel means for generating pulses at a frequency corresponding to the amplitude of the input signal.

Another object of this invention is to provide a novel counter for counting the total number of pulses generated, and for providing a digital output corresponding thereto.

Another object of this invention is to provide novel means for converting the digital output into an analog output.

Another object of this invention is to provide novel circuitry for controlling the counter.

This invention contemplates an electronic network comprising: means for providing an input signal; a pulse generator connected to the input signal means for providing pulses at a frequency corresponding to the amplitude of the input signal; a counter connected to the pulse generator and responsive to the pulses provided thereby for providing a digital output corresponding to the total number of said pulses; and a converter connected to the counter and responsive to the digital output therefrom for providing an analog output having an amplitude corresponding to the integral of the input signal amplitude.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings in which corresponding numerals indicate corresponding parts:

FIGURE 3 is an electrical schematic diagram showing the components included in the device of the present invention.

Figure 1:
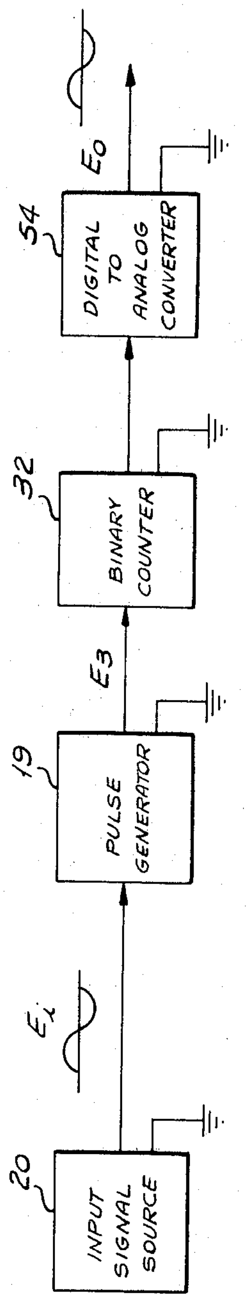
FIGURE 1 is a block diagram of an integrator constructed in accordance with the present invention.

With reference to FIGURE 1, an input signal source 20 provides a suppressed carrier, modulated alternating current signal $E_1$, such as is used in a flight control system or other servo system. The signal $E_1$ is applied to a pulse generator 19 which modulates the signal $E_1$ and provides a pulse $E_3$ having a frequency corresponding to the amplitude of the signal $E_1$. The pulse $E_3$ is applied to a binary counter 32 which provides digital outputs corresponding to the total number of the pulses $E_3$ generated by the pulse generator 19 in a given interval. The digital outputs from the binary counter 32 are applied to a digital to analog converter 54 which converts the digital outputs to an alternating current analog output $E_o$.

Since the frequency of the pulse $E_3$ provided by the pulse generator 19 corresponds to the amplitude of the input signal $E_i$ provided by the input signal source 20, and since the amplitude of the output signal $E_o$ provided by the digital to analog converter 54 corresponds to the total number of the pulses $E_3$ provided by the pulse generator 19, the amplitude of the output signal $E_o$ at the output of the digital to analog converter 54 is the integral of the amplitude of the input signal $E_i$.

$$E_3=K\int_0^T E_i dt$$

$$E_T=K\int_{t_0}^{t_i} E_i dt$$

where $E_T$ is the voltage level at which the pulse generator 19 is reset for another cycle.

$$E_T=K\int_{t_0}^{t_i} E_i dt=K\int_{t_1}^{t_2} E_i dt---=K\int_{t_{n-1}}^{t_n} E_i dt$$

where $n$=number of pulses $E_3$ in the interval T.

$$nE_T=K\int_0^T E_i dt$$

The output $E_o$ of the digital to analog converter 54 is proportional to the number of pulses $n$, therefore;

$$E_o=K_1 n$$

$$E_0=K_2\int_0^T E_i dt,\text{ where } K_2=\frac{KK_1}{E_T}$$

Figure 2:
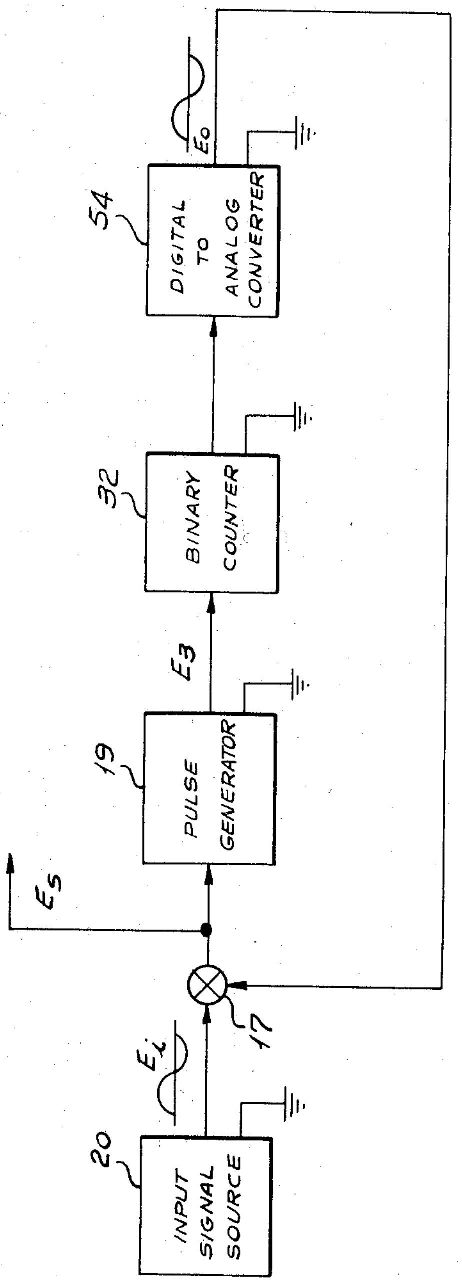
FIGURE 2 is a block diagram of a synchronizer constructed in accordance with the present invention.
Figure 2:
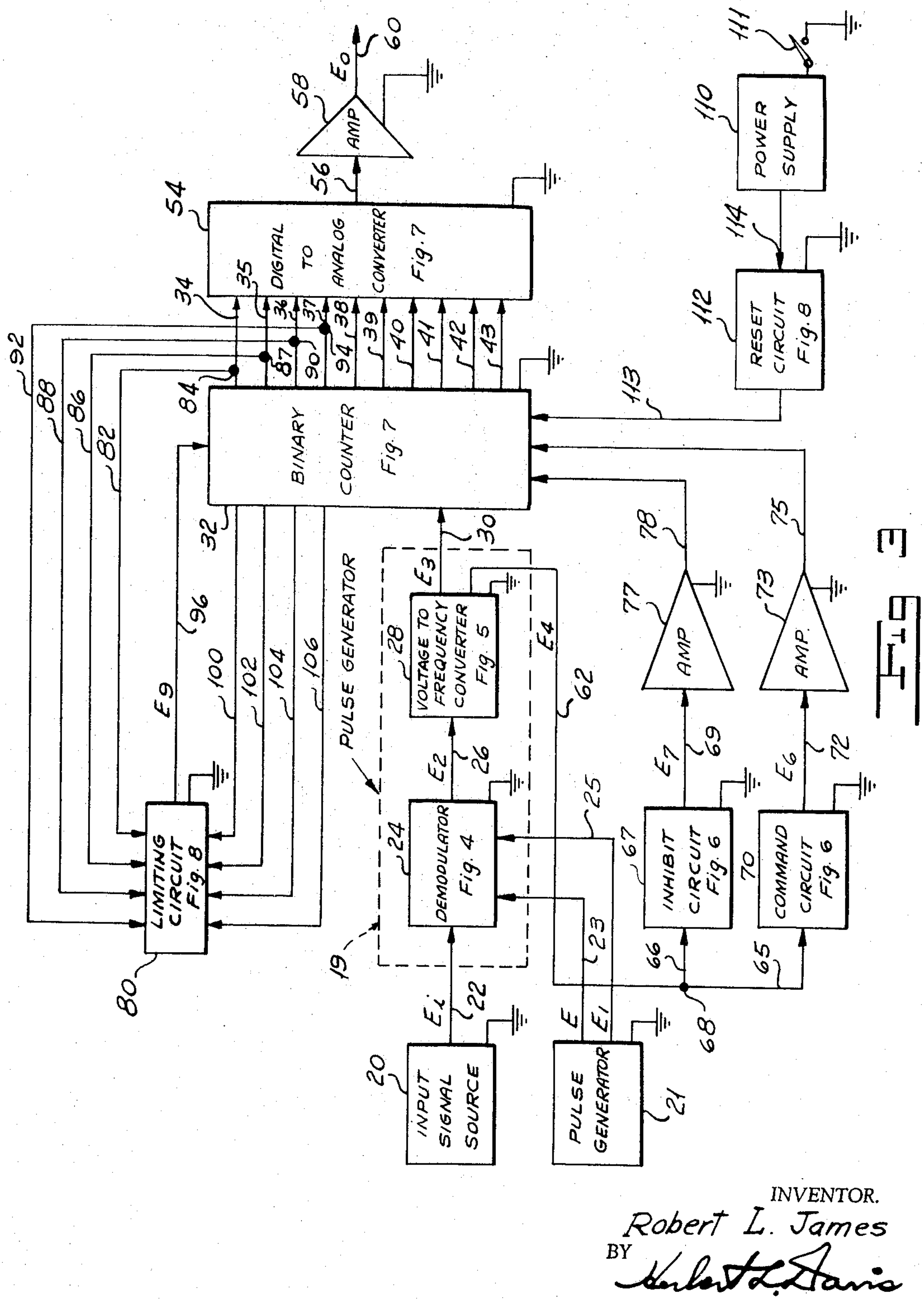

With reference to FIGURE 2, when the device of the present invention is used as a synchronizer, analog output $E_o$ from converter 54 is applied through a feedback loop to a summation means 17. Input signal $E_i$ provided by input signal source 20 is also applied to summation means 17. Summation means 17 sums signals $E_o$ and $E_1$ and initially these signals cancel or wash each other out. At some predetermined synchronizing instant counter 32 is disabled, i.e. it stops counting the pulses from pulse generator 19 and provides a constant output corresponding to the total number of pulses from pulse generator 19 just prior to the synchronizing instant.

Signals $E_0$ and $E_1$ no longer wash out and summing means 17 provides a signal $E_s$ corresponding to the difference therebetween. Since signal $E_s$ is related to a point in time (the predetermined synchronizing instant) it is, in effect, a synchronized signal.

With reference to FIGURE 3, the suppressed carrier modulated alternating current input signal $E_i$ provided by the input signal source 20 is applied through an output conductor 22 to a demodulator 24 included in the pulse generator 19. The demodulator 24 is of the pulse sampler type and is driven by a pulse E and a pulse $E_1$ provided by a pulse generator 21, with the pulses E and $E_1$ applied to the demodulator 24 through an output conductor 23 and an output conductor 25, respectively, of the pulse generator 21. The demodulator 24 reduces the quadrature component of the suppressed carrier modulated alternating current input signal $E_i$, providing at an output conductor 26 a direct current signal $E_2$ corresponding to the suppressed carrier modulated alternating current input signal $E_i$.

The direct current signal $E_2$ from the demodulator 24 is applied through the output conductor 26 to a voltage to frequency converter 28 included in the pulse generator 19. The voltage to frequency converter 28 provides at an output conductor 30 the pulse $E_3$ having a frequency proportional to the amplitude of the direct current signal $E_2$, and provides at an output conductor 62 a ramp voltage $E_4$.

The pulse $E_3$ provided by the voltage to frequency converter 28 is applied through the output conductor 30 to a binary counter 32. Binary counter 32 provides at the output conductors 34 to 43 thereof digital outputs corresponding to binary bits of the total number of the pulses $E_3$ provided by the voltage to frequency converter 28. The output at the conductor 34 leading from the binary counter 32 corresponds to the most significant bit of the total number of the pulses $E_3$ and the output at the conductor 43 from the binary counter 32 corresponds to the least significant bit of the total number of the pulses $E_3$. The digital outputs provided by the binary counter 32 are applied through the conductors 34 to 43 to a digital to analog converter 54, and therefrom through an output conductor 56 to an amplifier 58. The amplifier 58 provides at an output conductor 60 the analog output $E_o$ corresponding to the total number of the pulses $E_3$ provided by the pulse generator 19.

It is necessary to control the counting direction of the binary counter 32 or, in other words, to command binary counter 32 to either count up or count down, in accordance with the polarity of the direct current signal $E_2$ provided by the demodulator 24 of the pulse generator 19. In order to accomplish this, the ramp voltage $E_4$ at the output conductor 62 of the voltage to frequency converter 28 of the pulse generator 19 is applied through the output conductor 62 and a conductor 65 joining the conductor 62 at a point 68 to a command circuit 70. The ramp voltage $E_4$ is also applied through the output conductor 62 and a conductor 66 joining the conductor 62 at the point 68 to an inhibit circuit 67.

The command circuit 70 is rendered effective at predetermined levels of the ramp voltage $E_4$ to provide a count up or count down command pulse $E_6$ at an output conductor 72. The command pulse $E_6$ is applied through the output conductor 72 to an amplifier 73, and therefrom through an output conductor 75 to the binary counter 32 for commanding the binary counter 32 to count up or count down.

The binary counter 32 is unable to distinguish between a change in the count up or count down command pulse $E_6$ provided by the command circuit 70 and the pulse $E_3$ provided by the voltage to frequency converter 28 of the pulse generator 19. Unless inhibited, the binary counter 32 will change its count of the total number of the pulses $E_3$ in response to a change in the count up or count down command pulse $E_6$, resulting in an error in the output of the binary counter 32 at the output conductors 34 to 43. To prevent this, the inhibit circuit 67 is rendered effective at another predetermined level of the ramp voltage $E_4$ provided by the voltage to frequency converter 28 of the pulse generator 19 to provide at an output conductor 69, during the time that the count up or count down command pulse $E_6$ is changing, an inhibit pulse $E_7$ which is applied through the output conductor 69 to an amplifier 77, and therefrom through an output conductor 78 to the binary counter 32. The pulse $E_7$ renders the binary counter 32 unresponsive to any input pulses during the time that the count up or count down command pulse $E_6$ provided by the command circuit 70 is changing, thereby preventing erroneous outputs from occurring at the output conductors 34 to 43 of the binary counter 32 due to a change in the pulse $E_6$.

Binary counter 32 will automatically reset when the capacity of the counter 32 in either the count up or count down direction is reached. This resetting provides a sudden change in the amplitude of the signal $E_o$ at the output conductor 60 from one polarity extreme to the other. To prevent this automatic resetting, a limiting circuit 80 is provided. Outputs corresponding the the four most significant bits of the total number of the pulses $E_3$, at the output conductors 34 to 37 of the binary counter 32, are applied to the limiting circuit 80 through a conductor 82 joining the output conductor 34 at a point 84, a conductor 86 joining the output conductor 35 at a point 87, a conductor 88 joining the output conductor 36 at a point 90 and a conductor 92 joining the output conductor 37 at a point 94. When the counter 32 is near its full capacity in a counting direction, that is, when signals corresponding, for example, to all "ones" occur at the output conductors 34 to 37, limiting circuit 80 provides a signal $E_9$ at an output conductor 96 thereof, which is applied to the binary counter 32 through the output conductor 96, causing the binary counter 32 to stop counting until a change in the count up or count down command pulse $E_6$ occurs. When the binary counter 32 nears its capacity in the other counting direction, signals are applied to the limit logic circuit 80 through the output conductors 100, 102, 104 and 106 of the binary counter 32, with the output conductors 100, 102, 104 and 106 providing outputs complementary to the outputs provided by the output conductors 34, 35, 36 and 37, respectively. The limit logic circuit 80 again provides at the output conductor 96 the signal $E_9$ to prevent the binary counter 32 from counting in the other direction until a change in the count up or count down command pulse $E_6$ occurs.

It is necessary for the device of the present invention to provide a zero output at the output conductor 60 when a power supply designated by the numeral 110 is turned on by closure, for example, of a ground switch 111 to start the device operating. The output of the power supply 110 is applied through an output conductor 114 to a reset circuit 112. At the instant the direct current supply 110 is turned on, the reset circuit 112 provides at an output conductor 113, a pulse of a predetermined duration. The pulse is applied through the output conductor 113 to the binary counter 32 to reset the binary counter 32 so that outputs corresponding to a combination of zeros and ones are provided at the output conductors 34 to 43 of the binary counter 32 to provide a null in the output $E_0$ provided at the output conductor 60 of the amplifier 58.

The components of the present invention, shown generally in the block diagram of FIGURE 3 and including the demodulator 24, the voltage to frequency converter 28, the binary counter 32, the command circuit 70, the inhibit circuit 67, the limiting circuit 80, the reset circuit 112, and the digital to analog converter 54 are shown in detail with reference to FIGURES 4 to 8.

Figures 4, 4A, 4B, 4C, 4D:
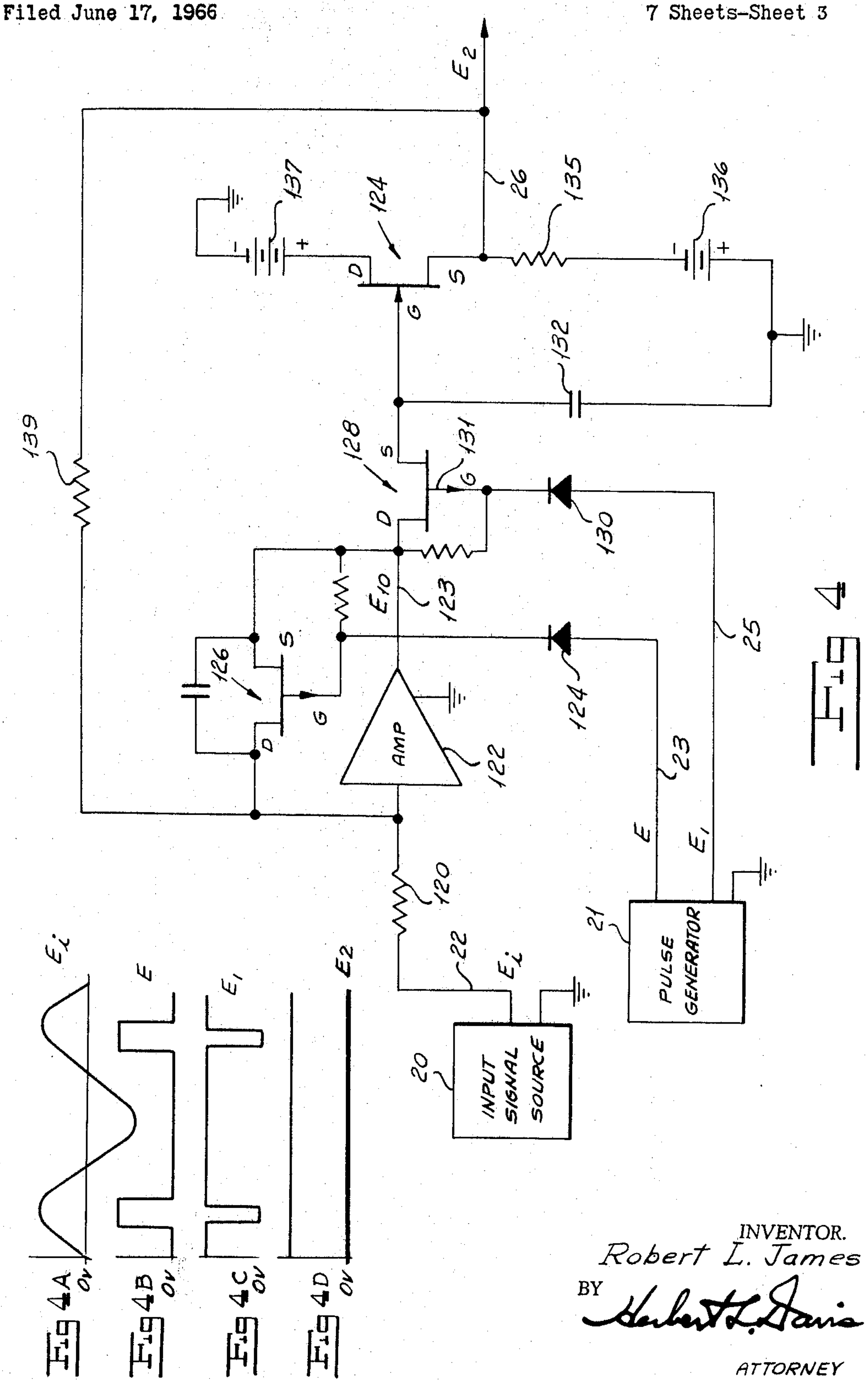
FIGURE 4 is a circuit diagram of the demodulator shown generally in FIGURE 3.
FIGURE 4A is a graphical representation showing the wave form of the input signal $E_1$ applied to the demodulator of FIGURE 4.
FIGURE 4B is a graphical representation showing the wave form of a pulse E supplied by a pulse generator to drive the demodulator of FIGURE 4.
FIGURE 4C is a graphical representation showing the wave form of another pulse $E_1$ supplied by the pulse generator to drive the demodulator of FIGURE 4.
FIGURE 4D is a graphical representation of the direct current output $E_2$ of the demodulator of FIGURE 4.

The demodulator 24 of the pulse generator 19, shown generally in FIGURE 3, is shown in detail in FIGURE 4. The suppressed carrier modulated alternating current input signal $E_i$ provided by the input signal source 20, having a sinusoidal wave form as shown in the graphical representation of FIGURE 4A, is applied through the output conductor 22 of the input signal source 20 and a resistor 120 to an amplifier 122. The pulse E provided by the pulse generator 21 is applied through the output conductor 23 and a diode 124 to a field effect transistor 126 connected in the feedback path of the amplifier 122. The transistor 126 is affected by the pulse E so that once each cycle of the input signal $E_i$, the amplifier 122 is gated by the transistor 126 to provide at an output conductor 123 a pulse $E_{10}$. With reference to the graphical representations of FIGURES 4A and 4B, pulse E from the pulse generator 21 occurs at the 90 degree point of the in-phase component of the signal $E_i$. At this instant the in-phase component of the signal $E_i$ is at a maximum value and the quadrature component of the signal $E_i$ crosses zero. The output pulse $E_{10}$ at the output conductor 123 of the amplifier 22 is thus proportional in amplitude to the amplitude of the in-phase component of the suppressed carrier modulated alternating current signal $E_i$ and independent of the quadrature component of the signal $E_i$.

The output pulse $E_{10}$ at the output conductor 123 of the amplifier 122 is applied to a series connected field effect transistor 128. The pulse $E_1$ from the pulse generator 21 which decreases toward ground from a predetermined positive level is applied through the output conductor 25 and a diode 130 to a gating terminal 131 of the field effect transistor 128 so as to cause the transistor 128 to pass the output pulse $E_{10}$ from the amplifier 122. As shown in the graphical representations of FIGURES 4A, 4B and 4C, the pulse $E_1$ from the pulse generator 21 at the output conductor 25 occurs during the time that the amplifier 122 is gated by the transistor 126 in response to the positive going pulse E from the pulse generator 21 at the output conductor 23. As shown by FIGURES 4B and 4C, the pulse E is of longer duration than the pulse $E_1$.

The pulse $E_{10}$ that is passed by the transistor 128 upon the pulse $E_1$ being applied to the gating terminal 13 is stored in a "hold" capacitor 132 connected to the input of a field effect transistor 124. The field effect transistor 124 has a gating terminal connected to one plate of the capacitor 132 while the opposite plate of the capacitor 132 is connected to ground. A battery 136 has a positive terminal connected to ground while the opposite negative terminal is connected through a resistor 135 to a supply terminal of the transistor 124. A drain terminal of the transistor 134 is connected to a positive terminal of a battery 137 having a negative terminal connected to ground. The arrangement is such that there is provided at the output conductor 26 from the demodulator 24 the direct current signal $E_2$ shown in the graphical representation of FIGURE 4D. The signal $E_2$ has low output impedance and is proportional in amplitude to the amplitude of the suppressed carrier alternating current input signal $E_i$ provided by the input signal source 20 and applied through the output conductor 22 thereof. The proportionality factor is essentially the ratio of the value of a feedback resistor 139, through which the direct current signal $E_2$ is fed back as an input to the amplifier 122, to the input resistor 120.

The novel demodulator 24 shown generally in FIGURE 3 and in detail in FIGURE 4 is the subject matter of a copending U.S. application Ser. No. 558,467, filed June 17, 1966, by Robert L. James, and assigned to The Bendix Corporation, assignee of the present invention.

Figures 5, 5A, 5B:
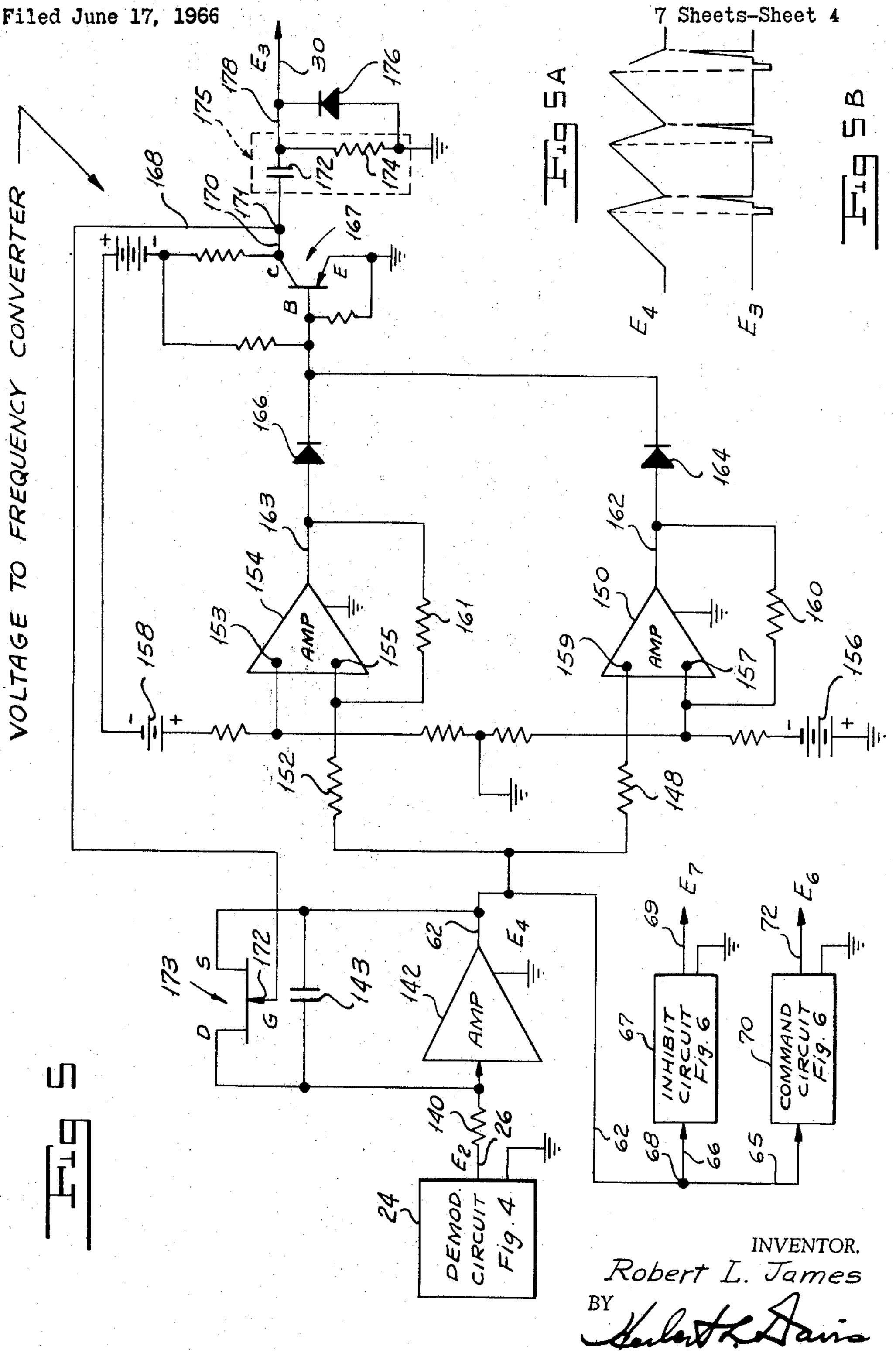
FIGURE 5 is a circuit diagram of the voltage to frequency converter shown generally in FIGURE 3.
FIGURE 5A is a graphical representation showing the wave form of the ramp voltage $E_4$ provided by the voltage to frequency converter of FIGURE 5.
FIGURE 5B is a graphical representation showing the wave form of the pulse output $E_3$ provided by the voltage to frequency converter of FIGURE 5.

The voltage to frequency converter 28 of the pulse generator 19, shown generally in FIGURE 3, is shown in detail in FIGURE 5. The direct current signal $E_2$ at the output conductor 26 of the demodulator 24 is applied through the output conductor 26 and an input resistor 140 to an amplifier 142. A capacitor 143 is connected in the feedback path of the amplifier 142 so that the amplifier 142 provides at the output conductor 62 the ramp voltage $E_4$ having a wave form as illustrated in the graphical representation of FIGURE 5A. The ramp voltage $E_4$ is applied to the command circuit 70 and to the inhibit pulse generator 67, as heretofore noted with reference to FIGURE 3.

The ramp voltage $E_4$ is applied through a resistor 148 to an amplifier 150 and through a resistor 152 to an amplifier 154. The amplifier 150 compares the ramp voltage $E_4$ applied through the resistor 148 to a negative bias voltage provided by a suitable source of direct current such as a battery 156. When the ramp voltage $E_4$ is equal to the bias voltage provided by the battery 156, regenerative action occurs through a resistor 160 connected in the feedback path of the amplifier 150. The output of the amplifier 150 at an output conductor 162 changes from a saturated state of one polarity to a saturated state of the opposite polarity, with the output being applied through a diode 164 to a transistor 167. The transistor 167 amplifies the applied output and provides an output at an output conductor 170. The output at the output conductor 170 of the transistor 167 is applied through a conductor 168 joining the conductor 170 at a point 171 to a gating terminal 172 of a field effect transistor 173 connected across the capacitor 143 in the feedback path of the amplifier 142 and in which a drain terminal is connected to the input of the amplifier 142 while a source terminal is connected to the output conductor 62. The field effect transistor 173 is rendered conductive upon a positive going gating pulse being applied through conductor 168 to the gating terminal 172 whereupon the capacitor 143 discharges through the field effect transistor 173, causing a drop in the ramp voltage $E_4$ of the amplifier 142 at the output conductor 62. When to drop in the ramp voltage $E_4$ is sufficient to overcome the hysteresis in the feedback path of the amplifier 150, the output of the amplifier 150 at the output conductor 162 changes back to its prior saturated state. The output of the amplifier 150 at the output conductor 162 is applied through the diode 164 to the base of the transistor 167 to control through the conductor 168 the gating terminal 172 so as to render the field effect transistor 173 cut-off and the capacitor 143 effective in the feedback loop of the amplifier 142 to initiate a new charging cycle. The voltage $E_4$ at the output conductor 62 thus has a saw tooth wave form as illustrated in the graphical representation of FIGURE 5A, and has a frequency depending on the characteristics of the input resistor 140, the capacitor 143, the hysteresis in the feedback path of the amplifier 150 and the level of the bias voltage provided by the battery 156.

The amplifier 154 is biased by a positive voltage from a suitable source of direct current such as a battery 158, and operates in a manner analogous to that of the amplifier 150, with the amplifiers 150 and 154 thereby rendering the transistor 167 and the field effect transistor 173 responsive to positive and negative going ramp voltages $E_4$. Also, the corresponding bias and input connections 153 and 157, and 155 and 159, respectively, of the amplifiers 150 and 154, are in reverse relation to each other, thereby providing corresponding output pulses at the output conductors 162 and 163, although the amplifier 150 responds to a negative going ramp voltage $E_4$ and the amplifier 154 responds to a positive going ramp voltage $E_4$.

The output of the amplifier 154 at the output conductor 163 is applied through a diode 166 and therefrom to the transistor 167 to drive the field effect transistor 173 as heretofore noted with reference to the operation of the amplifier 150.

Along with the saw tooth output $E_4$ illustrated in the graphical representation of FIGURE 5A, the voltage to frequency converter of FIGURE 5 provides at the output conductor 30 the pulse $E_3$ having a frequency corresponding to the amplitude of the input signal $E_1$ as heretofore noted with reference to FIGURE 3. The output provided at the output conductor 170 of the transistor 167 occurs for the interval of time during which the capacitor 143 in the feedback path of the amplifier 142 discharges. This output is applied through the output conductor 170 to a differentiating network 175 including a capacitor 172 and a resistor 174. The output of the differentiating network 175 at an output conductor 178 is clipped by a diode 176 to provide the pulse $E_3$ at the output conductor 30 having a wave form related to the wave form of the ramp voltage $E_4$ as may be seen by comparing FIGURES 5A and 5B.

The novel voltage to frequency converter shown in FIGURE 5 is the subject mater of a copending U.S. application Ser. No. 570,666, filed Aug. 5, 1966, by Robert L. James, and assigned to The Bendix Corporation, assignee of the present invention.

As heretofore noted, the voltage to frequency converter 28 shown generally in FIGURE 3, and in detail in FIGURE 5, provides the pulse $E_3$ at the output conductor 30 independent of whether the ramp voltage $E_4$ at the output conductor 62 is positive or negative going. It is thus necessary to provide a pulse corresponding to the polarity of the ramp voltage $E_4$ for commanding the binary counter 32 to either count up or count down with the polarity of the ramp voltage $E_4$. Also, since the binary counter 32 can not distinguish the count up or count down command pulse $E_6$ from the pulse $E_3$ provided by the voltage to frequency converter 28, it is necessary to provide a pulse for inhibiting the binary counter 32 so that the binary counter

32 will not respond to a change in the count up or count down command pulse $E_6$. The control network shown in FIGURE 6, including the command circuit 70 and the inhibit circuit 67 accomplishes these purposes.

Figures 6, 6A, 6B:
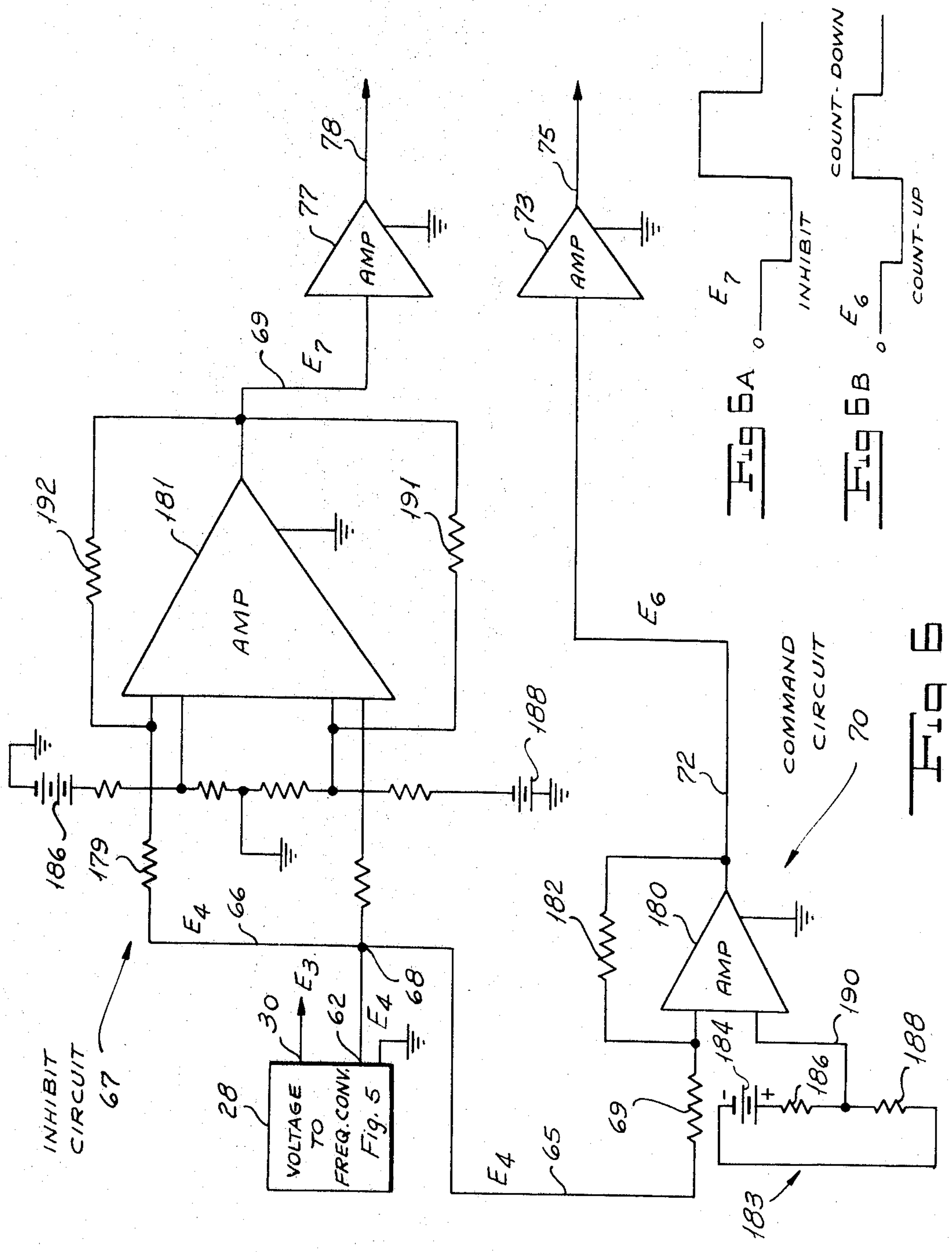
FIGURE 6 is a circuit diagram of the inhibit circuit and of the command circuit shown generally in FIGURE 3.
FIGURE 6A is a graphical representation showing the wave form of the output $E_7$ of the inhibit circuit of FIGURE 6.
FIGURE 6B is a graphical representation showing the wave form of the output $E_6$ of the command circuit of FIGURE 6.

With reference to FIGURE 6, the ramp voltage $E_4$ at the output conductor 62 of the voltage to frequency converter 28 is applied through the output conductor 62 and the conductor 65 joining the output conductor 62 at the point 68 and leading through a resistor 69 to an amplifier 180 included in the command circuit 70. The ramp voltage $E_4$ is further applied through the output conductor 62 and the conductor 66 joining the conductor 62 at the point 68 and through a resistor 179 to an input of an amplifier 181 included in the inhibit circuit 67. A resistor 182 is connected in the feedback path of the amplifier 180. A circuit 183, including a battery 184, a resistor 186 and a resistor 188, provides a bias voltage which is applied through a conductor 190 to the amplifier 180.

When the ramp voltage $E_4$ applied to the amplifier 180 through the conductor 65 and the resistor 69, and the bias voltage applied by the circuit 183 through the conductor 190, are equal, the amplifier 180 operates in its linear range. Regenerative action occurs through the resistor 182, and the pulse $E_6$ provided at the output conductor 72 of the command circuit 70 changes rapidly from one output level to another. The bias voltage provided by the circuit 183 and the feedback loop hysteresis of the amplifier 180 are selected so that the level of the pulse $E_6$ changes whenever the ramp voltage $E_4$ at the output conductor 62 of the voltage to frequency converter 28 increases in either direction from ground potential, with the pulse $E_6$ thereby having a wave form as shown in the graphical illustration of FIGURE 6B. For example, when the ramp voltage $E_4$ is more positive than the positive bias provided by the circuit 183, the pulse $E_6$ at the output conductor 72 is at a predetermined positive level designated as "count down" in FIGURE 6B. When the ramp voltage $E_4$ decreases toward ground potential, as a result of a change of polarity in the input signal $E_2$ to the voltage to frequency converter 28 as shown in FIGURE 5, the pulse $E_6$ will remain at the "count down" level until the ramp voltage $E_4$ has passed through ground and decreases in the opposite polarity to reach a predetermined negative level designated in FIGURE 6B as "count up" and established by the feedback hysteresis of the amplifier 180. The pulse $E_6$ at the output conductor 72 of the amplifier 180 is applied to the amplifier 73 and therefrom through the output conductor 75 to the binary counter 32 as shown in FIGURE 3.

The amplifier 181 included in the inhibit circuit 67 compares the ramp voltage $E_4$ from the voltage to frequency converter 28 to a positive bias voltage provided by a suitable source of direct current shown as a battery 186, and to a negative bias voltage provided by a suitable source of direct current such as a battery 188. A resistor 191 and a resistor 192 are included in dual feedback paths of the amplifier 181, so that the inhibit circuit 67 provides at the output conductor 69 a pulse $E_7$ having two output levels as shown in the graphical representation of FIGURE 6A. The pulse $E_7$ at the output conductor 69 is applied to the amplifier 77 and therefrom through the output conductor 78 to the binary counter 32 as shown in FIGURE 3. The binary counter 32 is arranged so as not to be inhibited when the pulse $E_7$ is at the positive output level shown in FIGURE 6A, but will be inhibited when the pulse $E_7$ is at the negative or "inhibit" level shown in FIGURE 6A. The inhibit circuit 67 is arranged so as to always provide the pulse $E_7$ at the negative "inhibit" level whenever the ramp voltage $E_4$ is in the region where a change in the command pulse $E_6$ occurs, and at the positive level when the ramp voltage $E_4$ reaches higher levels, with the pulse $E_3$ from the voltage to frequency converter 28 being initiated at the higher output levels of the ramp voltage $E_4$ by the circuitry shown in FIGURE 5.

The novel control network including the command circuit 70 and the inhibit circuit 67 are the subject matter of a copending U.S. application Ser. No. 570,643, filed Aug. 5, 1966, by Robert L. James, and assigned to The Bendix Corporation, assignee of the present invention.

Figure 7:
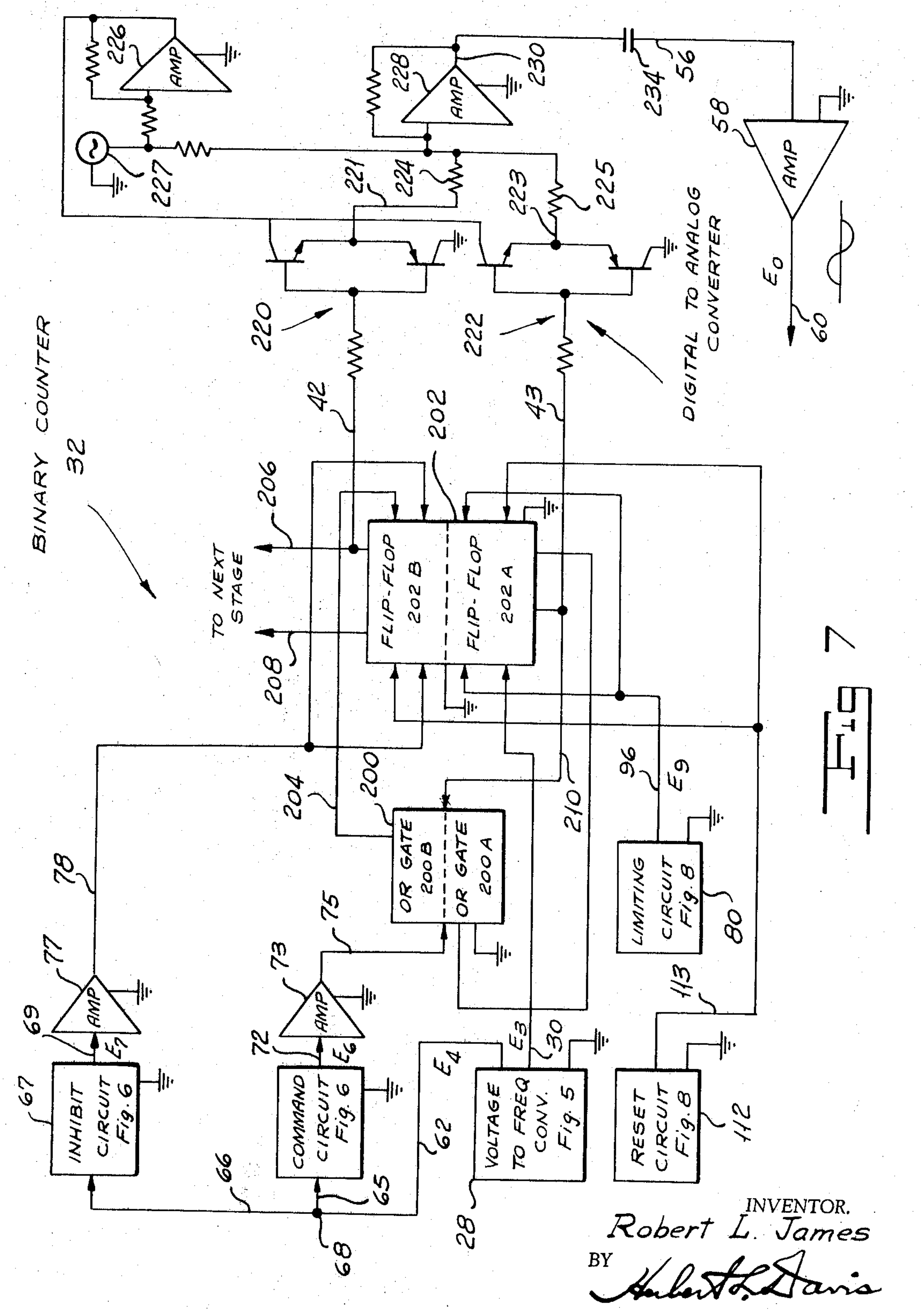
FIGURE 7 is a circuit diagram of the binary counter and of the digital to analog converter shown ge nerally in FIGURE 3.

The pulses $E_3$ from the voltage to frequency converter 28 are applied through the output conductor 30 to the binary counter 32 shown generally in FIGURE 3 and in detail in FIGURE 7. The binary counter 32 provides at the output conductors 34 to 43 shown in FIGURE 3 outputs at "zero" and "one" logic levels corresponding to binary bits of the total number of pulses $E_3$ from the voltage to frequency converter 28. The outputs provided by the binary counter 32 are applied through the output conductors 34 to 43 to the digital to analog converter 54, shown generally in FIGURE 3 and in detail in FIGURE 7, which provides at the output conductor 60 the analog voltage $E_o$ corresponding to the total number of pulses $E_3$ from the voltage to frequency converter 28.

The binary counter 32 includes a plurality of stages, with each of the stages providing an output corresponding to a binary bit of the total number of pulses $E_3$ such as the outputs provided at the conductors 42 and 43 shown in FIGURE 7, with only two such output conductors being shown in FIGURE 7 by way of example. Each of the stages of the bnary counter 32 comprises one-half of a dual flip-flop circuit, such as the dual flip-flop circuit 202 with the respective halves of the dual flip-flop circuit 202 carrying the designation 202A and 202B. The flip-flop 202A is driven by one-half of a dual OR gate 200, designated as 200A, and the flip-flop 202B is driven by the other half of the dual OR gate 200 designated as 200B. The pulse $E_3$ from the voltage to frequency converter 28 is applied through the output conductor 30 to the dual flip-flop circuit 202. The count up or count down command pulse $E_6$ from the command circuit 70 shown in FIGURE 6 is applied through the conductor 75 to the dual OR gate 200. The OR gate 200A and the OR gate 200B act as switches affecting an output at either the output conductor 208 or the output conductor 206 of the dual flip-flop circuit 202 to drive the next stage of the binary counter 32, with the dual flip-flop 202 providing at the output conductors 42 and 43 the outputs corresponding to the binary bits of the total number of pulses $E_3$ from the voltage to frequency converter 28.

The inhibit pulse $E_7$ from the inhibit pulse generator 67, shown in FIGURE 6, is applied through the output conductor 78 to the dual flip-flop circuit 202. The dual flip-flop circuit 202 responds to a predetermined level of the inhibit pulse $E_7$, as shown in the graphical representation of FIGURE 6A, so as to be prevented from responding to any input pulses when the pulse $E_7$ is at the inhibit level shown in FIGURE 6A. The dual flip-flop circuit 202 and the dual OR circuit 200 are arranged, through the conductor 204 which connects an output of the dual OR circuit 200 to an input of the dual flip-flop circuit 202, and the conductor 210 which connects an output of the dual flip-flop circuit 202 to an input of the dual OR circuit 200, so that the dual OR circuit 200 driven by the count up or count down command pulses $E_6$ applied through the conductor 75 from the command circuit 70 changes the counting direction of the binary counter 32.

The digital to analog converter 54 shown generally in FIGURE 3 and in detail in FIGURE 7 comprises a plurality of stages, corresponding to the plurality of stages of the binary counter 32, with each of the stages of the digital to analog converter 54 including a two-transistor gate, with two such gates being shown by way of example and designated as a gate 220 and a gate 222. The gates 220 and 222 are biased by the output from a suitable source of alternating current 227 so that one of the transistors in each of the gates, when rendered conductive by a signal corresponding to a binary bit of the total number of pulses $E_3$ applied through the conductors 42 and 43, provides a fixed amplitude sine wave signal at the output conductors 221 and 223, respectively, of the gates 220 and 222. The fixed amplitude sine wave signal is applied through the conductor 223 to a resistor 225. The resistors 224 and 225 are connected to an input of a summing amplifier 228 which sums the inputs thereto from the gates 220 and 222 providing an output at an output conductor 230. The output at the output conductor 230 is coupled to the amplifier 58 through a blocking capacitor 234 and the output conductor 56, with the amplifier 58 providing at the output conductor 60 the analog output $E_o$.

The novel binary counter 32 and the novel digital to analog converter 54 shown generally in FIGURE 3 and in detail in FIGURE 7 are the subject matter of a copending U.S. application Serial No. 603,631, filed Dec. 21, 1966, by Robert L. James, and assigned to The Bendix Corporation, assignee of the present invention.

Figure 8:
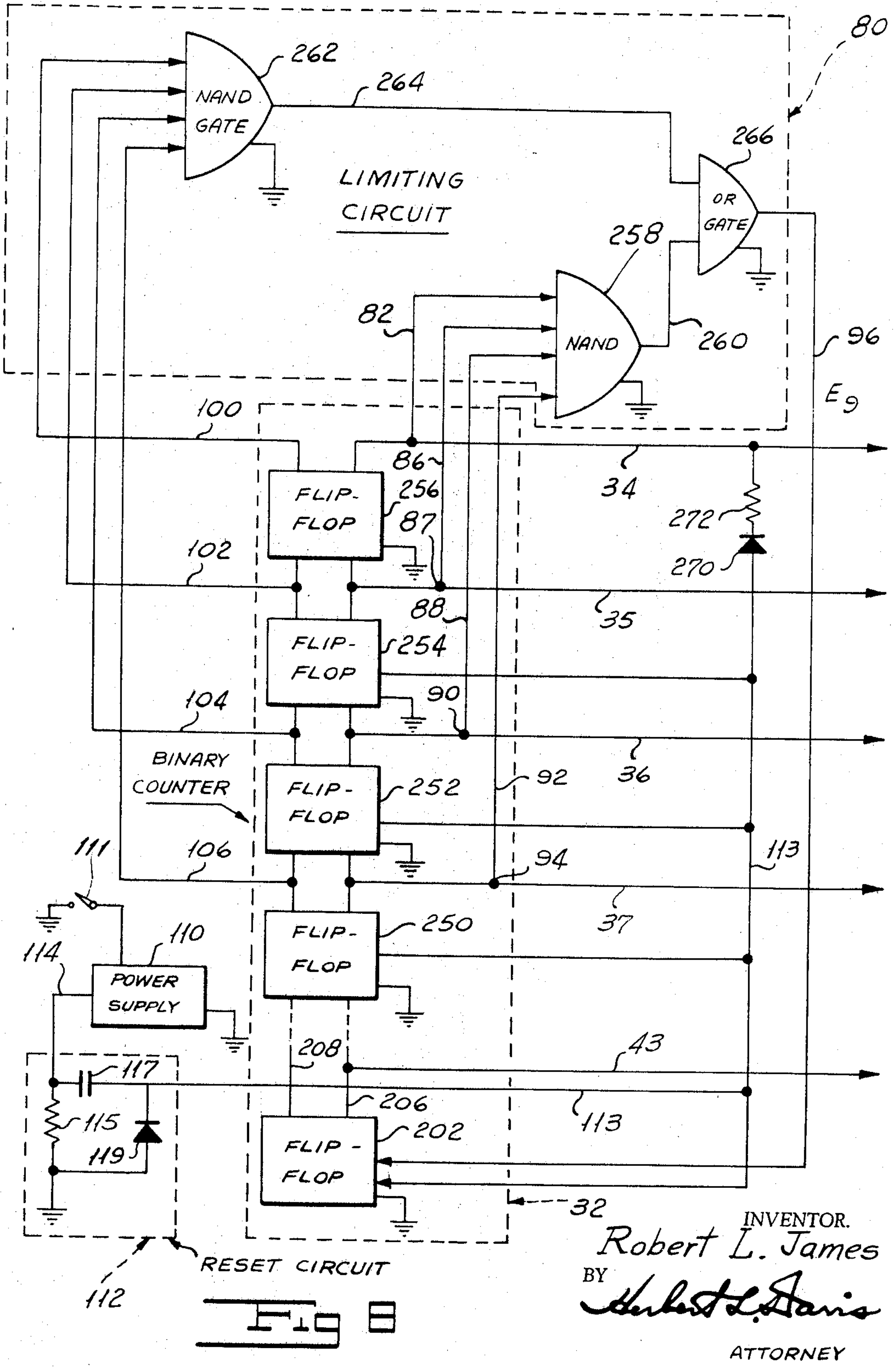
FIGURE 8 is a circuit diagram showing the limiting circuit and the reset circuit shown generally in FIGURE 3.

As heretofore noted with reference to FIGURE 3, when the binary counter 32 is near its full capacity in either the count up or count down direction, the limiting circuit 80 provides a signal $E_9$ to cause the binary counter 32 to stop counting until a change in the count up or count down pulse $E_6$ occurs. With reference to FIGURE 8, when a limit in either the count up or count down direction of the binary counter 32 is reached, the signal $E_9$ is applied through the output conductor 96 and inhibits the first dual flip flop 202 of the binary counter 32. All succeeding flip flops of the binary counter 32, such as those designated by the numerals 250, 252, 254 and 256 are also inhibited since each succeeding flip flop is driven by the preceeding flip flop as shown in FIGURES 7 and 8.

The outputs of the four most significant stages of the binary counter 32, with the four most significant stages being represented by the flip flops 250, 252, 254, and 256, are applied to a NAND gate 258 in the limiting circuit 80 through the conductors 34, 35, 36 and 37 joining the conductors 86, 88, 92 and 94 at the points 84, 87, 90 and 94, respectively. When the binary bits of the total number of the pulses $E_3$ provided at the output conductors 34, 35, 36 and 37, respectively, for example, are all "ones," the output of the NAND gate 258 at an output conductor 260 will be zero. To limit the binary counter 32 in the other counting direction, the complementary outputs of the most significant satges of the binary counter 32 at the output conductors 106, 104, 102 and 100 are applied through the conductors 106, 104, 102 and 100, respectively, to another NAND gate 262. When the outputs are applied through the conductor 106, 104, 102 and 100 are all "ones," the output of the NAND gate at an output conductor 264 will be zero.

The output of the NAND gate 258 at the output conductor 260 and the output of the NAND gate 262 at the output conductor 264 are applied to an OR gate 266. When either of the outputs of the NAND gates 258 and 262 at the output conductors 260 and 264, respectively, are zero, the OR gate 266 provides the signal $E_9$ at the output conductor 96 which inhibits the flip flop 202 as heretofore noted.

With further reference to FIGURE 8, the reset circuit 112 shown generally in FIGURE 3 includes a resistor 115, a capacitor 117 and a diode 119. When the switch 111 is operated to apply power from the power supply 110 to the reset circuit 112 through the output conductor 114, a pulse is provided at the output conductor 113 which is applied to each of the dual flip flops 202, 250, 252, and 254 of the binary counter 32. The pulse from the reset circuit 112 is also applied to the output terminal of the most significant stage of the binary counter 32 represented by the flip flop 256 through a diode 270 and a resistor 272. The pulse at the output conductor 113 resets the flip flops 202, 250, 252 and 254 of the binary counter 32 to the same output state and sets the most significant flip flop 256 to the opposite output state so as to provide a null output at the output conductors 34, 35, 36, 37 and 43 of the binary counter 32.

The novel limiting circuit 80 and the novel reset circuit 112 shown generally in FIGURE 3 and in detail in FIGURE 8 are the subject matter of a copending U.S. application Ser. No. 589,045, filed Oct. 24, 1966, by Robert L. James, and assigned to The Bendix Corporation, assignee of the present invention.

The digital integrator-synchronizer in accordance with the present invention provides means whereby signals used in flight control systems or other servo systems may be integrated or synchronized for proper operation of the system. The present invention accomplishes this with simplified circuitry and without moving parts, and is particularly adaptable to micro circuit construction.

In accomplishing the integration of the input signal designated in the figures as $E_i$, the signal $E_i$ is applied to the novel pulse generator 19 which provides a pulse $E_3$ having a frequency corresponding to the amplitude of the signal $E_i$. The pulse $E_3$ is applied to the novel binary counter 32 which counts the number of pulses $E_3$ providing digital outputs corresponding thereto. The digital outputs from the binary counter 32 are applied to the novel digital to analog converter 54 which converts the digital outputs into an alternating current analog output signal $E_o$ corresponding in amplitude to the integral of the input signal $E_i$.

When the device is used as a synchronizer the analog output signal $E_o$ is applied to a summation means 17 and combined thereat with the input signal $E_i$. The summation means 17 provides a synchronizer signal $E_s$.

Additionally, the novel command circuit 70 provides the pulse $E_6$ for controlling the counting direction of the binary counter 32. Also the novel inhibit circuit 67 provides the inhibit pulse $E_7$ for inhibiting the counter 32 from counting when the command pulse $E_6$ provided by the command circuit 70 is changing.

In order to prevent the binary counter 32 from automatically resetting when the capacity of the counter 32 in either the count up or count down direction is reached, thus providing a sudden change in the amplitude of the signal $E_o$ at the output conductor 60 from one polarity extreme to the other, the limiting circuit 80 provides the pulse $E_9$. The pulse $E_9$ causes the binary counter 32 to stop counting when the binary counter 32 nears its capacity in either counting direction until a change in the count up or count down command pulse $E_6$ occurs.

It is necessary for the device of the present invention to provide a zero output at the output conductor 60 when the power supply 110 is turned on to start the device operating. A reset circuit 112 provides a pulse which renders a null output at the output conductor 60 at the instant that the power supply 110 is turned on.

Although several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An electronic network, comprising:

means for providing an alternating current input signal;

a pulse generator including a demodulator connected to the input signal means for providing a direct current signal corresponding in amplitude to the inphase component thereof, and a voltage to frequency converter connected to the demodulator and responsive to the signal therefrom for providing pulses at a frequency in accordance with the input signal amplitude;

a counter connected to the voltage to frequency converter and effective prior to a predetermined synchronizing instant for counting the pulses and for providing a digital output varying as the total of said pulses, and effective after the synchronizing instant for providing a constant digital output corresponding to the total of said pulses just prior to the synchronizing instant, said counter having a plurality of output stages wtih each of said stages providing a bit of the digital output;

a converter connected to the counter and responsive to the digital outputs therefrom for providing an analog output signal corresponding to the integral of the input signal; and means connected to the input signal means and connected to the converter for summing the signals therefrom so that prior to the synchronizing instant the input signal and the signal from the converter wash out, and after the synchronizing instant the summing means provides a synchronized signal corresponding to the difference between the input and converter signals.

2. A device as described by claim 1, wherein the voltage to frequency converter includes:

means connected to the demodulator and responsive to the direct current signal provided thereby for providing a ramp voltage output;

first circuit means connected to the means for providing the ramp voltage output and responsive to the ramp voltage therefrom at one predetermined level for providing a first pulse and responsive to the ramp voltage output therefrom at another predetermined level for providing a second pulse;

the counter being connected to the first circuit means and responsive to the first pulse for counting in one direction and responsive to the second pulse for counting in the opposite direction;

second circuit means connected to the means for providing the ramp voltage output and responsive to the ramp voltage therefrom at yet another predetermined level for providing a third pulse; and the counter being connected to the second circuit means so as to be inhibited from counting by the third pulse.

3. A device as described by claim 1 including:

circuit means connected to a most significant of the output stages of the counter and responsive to the output bits therefrom for providing a pulse when the counter is at a predetermined counting limit; and the counter being connected to the circuit means and responsive to the pulse so as to be reset thereby.

4. A device as described by claim 1 including:

power supply means;

circuit means connected to the power supply means for providing a pulse when the power supply means is actuated so as to render the device operative;

the counter being connected to the circuit means and responsive to the pulse provided thereby for providing a predetermined digital output; and the converter being responsive to the predetermined digital output provided by the counter so as to null the analog output signal provided by the converter.

References Cited

UNITED STATES PATENTS

| | | | |
|---|---|---|---|
| 3,185,820 | 5/1965 | Williams et al. | 340—347 |
| 3,258,764 | 6/1966 | Muniz et al. | 340—347 |
| 3,295,126 | 12/1966 | Spady et al. | 340—347 |
| 3,333,090 | 7/1967 | Neer | 235—183 |
| 3,359,410 | 12/1967 | Frisby et al. | 340—347 |
| 3,378,779 | 4/1968 | Priddy | 329—101 |
| 3,080,555 | 3/1963 | Vadus et al. | 235—92 |
| 3,298,019 | 11/1967 | Nossen | 235—92 |
| 3,413,449 | 11/1968 | Brown | 235—92 |

MAYNARD R. WILBUR, Primary Examiner

J. GLASSMAN, Assistant Examiner